United States Patent
Hartl (10) Patent No.: US 6,626,575 B2
(45) Date of Patent: Sep. 30, 2003

(54) SPHERICAL PLAIN BEARING WITH SPREAD LOCK DUAL SEALING MEANS

(75) Inventor: Werner Hartl, Plainsboro, NJ (US)

(73) Assignee: Roller Bearing Company of America, West Trenton, NJ (US)

( * ) Notice: Subject to any disclaimer, the term of this patent is extended or adjusted under 35 U.S.C. 154(b) by 0 days.

(21) Appl. No.: 09/876,552

(22) Filed: Jun. 7, 2001

(65) Prior Publication Data

US 2002/0186904 A1 Dec. 12, 2002

(51) Int. Cl.[7] ............................................. F16C 23/04
(52) U.S. Cl. ....................................................... 384/145
(58) Field of Search ................................. 384/145, 146, 384/147, 151, 153

(56) References Cited

U.S. PATENT DOCUMENTS

| | | |
|---|---|---|
| 2,631,906 A | 3/1953 | Brock |
| 3,769,672 A | 11/1973 | Eklund |
| 3,832,022 A | 8/1974 | Reinsma et al. |
| 3,848,938 A | 11/1974 | Stella et al. |
| 3,947,075 A | 3/1976 | Ewertz |
| 4,080,013 A | 3/1978 | Koch |
| 4,080,015 A | 3/1978 | Greby et al. |
| 4,435,023 A | 3/1984 | Bolner |
| 4,522,411 A | 6/1985 | Burgan |
| 4,531,747 A | 7/1985 | Miura |
| 4,836,694 A | 6/1989 | Schmehr et al. |
| 5,002,406 A | 3/1991 | Morton et al. |
| 5,125,672 A | 6/1992 | Wycliffe |
| 5,385,352 A | 1/1995 | Kurose |
| 5,573,336 A | 11/1996 | Maroney |
| 5,909,880 A | 6/1999 | Waskiewicz |
| 5,967,899 A | 10/1999 | Schierling |
| 5,980,115 A | 11/1999 | Hoeting |
| 6,000,854 A | 12/1999 | Kellstrom et al. |
| 6,003,876 A | 12/1999 | Yamagishi et al. |
| 6,024,495 A | 2/2000 | Loos et al. |
| 6,026,917 A | 2/2000 | Zahradnik et al. |
| 6,030,124 A | 2/2000 | Moseberg et al. |
| 6,036,435 A | 3/2000 | Oklejas |
| 6,042,272 A | 3/2000 | Nagase |
| 6,062,734 A | 5/2000 | Bundgart |
| 6,065,879 A | 5/2000 | Mitsue et al. |
| 6,068,407 A | 5/2000 | Kobayashi et al. |
| 6,073,933 A | 6/2000 | Johnston |
| 6,082,901 A | 7/2000 | Arvidsson |
| 6,082,905 A | 7/2000 | Vignotto et al. |
| RE36,804 E | 8/2000 | Kajihara et al. |
| 6,102,575 A | 8/2000 | Obara |
| 6,103,164 A | 8/2000 | Bebjak et al. |
| 6,123,338 A | 9/2000 | Edelmann et al. |
| 6,126,321 A | 10/2000 | Fetty et al. |
| 6,132,096 A | 10/2000 | Damour et al. |
| 6,132,099 A | 10/2000 | Olszewski et al. |

*Primary Examiner*—Lenard A. Footland
(74) *Attorney, Agent, or Firm*—Sperry, Zoda & Kane (57) ABSTRACT

An improved seal configuration for use primarily with a spherical plain bearing wherein the sealing member includes a base with two outwardly extending lips, one extending in an inner direction and one extending in an outer direction. Both of the lips engage the bearing surface of an inner race member. The seal base member of the seal is mounted within a seal mounting groove defined in the bearing surface of the outer race member. The seal is preferably circular and includes a downwardly flexibly resilient inner and outer lip configuration which provide dual sealing and enhanced contaminant control for a spherical plain bearing.

21 Claims, 4 Drawing Sheets

SPHERICAL PLAIN BEARING WITH SPREAD LOCK DUAL SEALING MEANS

BACKGROUND OF THE INVENTION

1. Field of the Invention

The present invention deals with the field of spherical plain bearings generally and with means for sealing thereof for retaining lubrication between the generally spherical bearing surfaces and for preventing the movement of contaminants therebetween. Such spherical plain bearings normally include an inner and outer race member wherein the inner race member defines a spherically convex inner race bearing surface. Also the outer race member defines a cavity therein with an outer race bearing surface which is concave and generally spherical therein. These two surfaces are mated to one another and have complementary profiles. The present invention provides a unique configuration for sealing of these bearing surfaces to minimize contamination thereof and to enhance retaining of lubrication therebetween. Such seals can be of any material such as rubber, however the present invention contemplates the use of plastic.

2. Description of the Prior Art

Numerous prior art patents have been granted on various configurations of spherical plain bearings with different types of seal configurations for use therewith such as shown in U.S. Pat. No. 2,631,906 patented Mar. 17, 1953 to W. H. U. Brock and assigned to Automotive Products Company Limited on a "Sealing Device For Fluid Pressure Apparatus"; and U.S. Pat. No. 3,769,672 patented Nov. 6, 1973 to P. R. Eklund and assigned to The United States of America as represented by the Secretary of the Air Force on a "Method Of Making An Improved Teflon-Lined Spherical Bearing; and U.S. Pat. No. 3,832,022 patented Aug. 27, 1974 to H. L. Reinsma et al and assigned to Caterpillar Tractor Co. on a "Dual Seal Arrangement For A Spherical Joint"; and U.S. Pat. No. 3,848,938 patented Nov. 19, 1974 to L. Stella et al and assigned to The Torrington Company on a "Bearing And Bearing Seal"; and U.S. Pat. No. 3,947,075 patented Mar. 30, 1976 to H. P. Ewertz and assigned to Valley-Todeco, Inc. on a "Bearing System"; and U.S. Pat. No. 4,080,013 patented Mar. 21, 1978 to H. W. Kock and assigned to Roller Bearing Company of America on a "Sealed Self-Aligning Spherical Bushing"; and U.S. Pat. No. 4,080,015 patented Mar. 21, 1978 to D. F. Greby et al and assigned to Lear Siegler, Inc. on a "Bearing And Method For Manufacturing Same"; and U.S. Pat. No. 4,435,023 patented Mar. 6, 1984 to T. E. Bolner and assigned to Thiokol Corporation on an "Internally Actuated Spherical Bearing"; and U.S. Pat. No. 4,522,411 patented Jun. 11, 1985 to T. J. Burgan and assigned to Chicago Rawhide Mfg. Co. on "Fluid Seals With Self-Venting Auxiliary Lips"; and U.S. Pat. No. 4,531,747 patented Jul. 30, 1985 to T. Miura and assigned to Nippon Oil Seal Industry Co., Ltd. on an "Extended Wear Annular Oil Seal"; and U.S. Pat. No. 4,836,694 patented Jun. 6, 1989 to P. R. Schmehr et al and assigned to SKF Gleitlager GmbH on a "Bearing Seal"; and U.S. Pat. No. 5,002,406 patented Mar. 26, 1991 to J. R. Morton et al and assigned to Emerson Electric Co. on a "Sealing Structure For A Spherical Bearing Assembly"; and U.S. Pat. No. 5,125,672 patented Jun. 30, 1992 to H. Wycliffe and assigned to The BOC Group plc on "Shaft Sealing Arrangements"; and U.S. Pat. No. 5,385,352 patented Jan. 31, 1995 to I. Kurose and assigned to Uchiyama Manufacturing Corp. on a "Sealing System For Bearings, Particularly Radial-Type Bearings"; and U.S. Pat. No. 5,573,336 patented to M. E. Maroney on Nov. 12, 1996 on a "Seal For A Spherical Plain Bearing"; and U.S. Pat. No. 5,909,880 patented Jun. 8, 1999 to W. P. Waskiewicz and assigned to The Torrington Company on a "Polymer Bearing Seal And Sealed Bearing"; and U.S. Pat. No. 5,967,899 patented Oct. 19, 1999 to B. Schierling and assigned to Mannesman Sachs AG on a "Centrifugal Mass Device With An Axial Slide Bearing As Seal"; and U.S. Pat. No. 5,980,115 patented Nov. 9, 1999 to S. C. Hoeting and assigned to Setco Sales Co. on a "Bearing Seal With Uniform Fluid Purge"; and U.S. Pat. No. 6,000,854 patented Dec. 14, 1999 to M. Kellstrom et al and assigned to Aktiebolaget SKF on a "Sealed Bearing"; and U.S. Pat. No. 6,003,876 patented Dec. 21, 1999 to T. Yamagishi et al and assigned to Koyo Seikl Co., Ltd. on a "Sealing Member And Capped Bearing"; and U.S. Pat. No. 6,024,495 patented Feb. 15, 2000 to M. Loos et al and assigned to Asea Brown Boveri AG on an "Axial Sliding Bearing"; and U.S. Pat. No. 6,026,917 patented Feb. 22, 2000 to A. F. Zabradnik et al and assigned to Baker Hughes Incorporated on an "Earth-Boring Bit With Improved Bearing Seal"; and U.S. Pat. No. 6,030,124 patented Feb. 29, 2000 to R. Moseberg et al and assigned to INA Walzlager Scvhaeffler oHG on a "Linear Rolling Bearing With Longitudinal Sealing Elements"; and U.S. Pat. No. 6,036,435 patented Mar. 14, 2000 to R. A. Oklejas and assigned to Pump Engineering, Inc. on a "Thrust Bearing"; and U.S. Pat. No. 6,042,272 patented Mar. 28, 2000 to M. Nagase and assigned to NSK Ltd. on a "Rolling Bearing With A Sealing Device"; and U.S. Pat. No. 6,062,734 patented May 16, 2000 to A. Bundgart and assigned to SKF Sverige AB on a "Bearing Seal"; and U.S. Pat. No. 6,065,879 patented May 23, 2000 to N. Mitsue et al and assigned to NSK Ltd. on a "Rolling Bearing With Seal"; and U.S. Pat. No. 6,068,407 patented May 30, 2000 to E. Kobayashi et al and assigned to Minebea Kabushiki-Kaisha on a "Seal For An Anti-Friction Bearing"; and U.S. Pat. No. 6,073,933 patented Jun. 13, 2000 to D. E. Johnson and assigned to Freudenberg-NOK General Partnership on a "Load Bearing Washer And Dirt Excluder"; and U.S. Pat. No. 6,082,901 patented Jul. 4, 2000 to T. N. Arvidsson and assigned to Andritz Inc. on an "Hydraulic Axial Bearing"; and U.S. Pat. No. 6,082,905 patented Jul. 4, 2000 to A. Vignotto et al and assigned to SKF Industrie S.p.A. on a "Sealing Assembly For A Rolling Bearing"; and U.S. Pat. No. Re. 36,804 patented Aug. 1, 2000 to K. Kajhara et al and assigned to Koyo Seiko Co., Ltd. on a "Bearing Sealing Device And Bearing Sealing Mechanism Capable Of Preventing The Leakage Of Grease"; and U.S. Pat. No. 6,102,575 patented Aug. 15, 2000 to R. Obara and assigned to Minebea Co., Ltd. on a "Compound Bearing Apparatus"; and U.S. Pat. No. 6,103,164 patented Aug. 15, 2000 to S. Bebjak et al and assigned to Firma Druckgusswerk Mossner GmbH on a "Method For Manufacturing A Seal In A Bearing Groove Of A Cylinder Head"; and U.S. Pat. No. 6,123,338 patented Sep. 26, 2000 to L. Edelmann and assigned to SKF Linearsysteme GmbH on a "Radial Seal For Ball Bearing"; and U.S. Pat. No. 6,126,321 patented Oct. 3, 2000 to M. W. K. Fetty et al and assigned to Brenco Incorporated on a "Shaft Journal Bearing And Seal Wear Ring Assembly"; and U.S. Pat. No. 6,132,096 patented Oct. 17, 2000 to P. Damour et al and assigned to Glyco-Metal-Werke Glyco B.V. & Co. KG on a "Bearing Bush And Method For The Production Thereof"; and U.S. Pat. No. 6,132,099 patented Oct. 17, 2000 to P. Olszewski et al and assigned to INA Walzlager Schaeffler OHG on a "Radial Bearing For A Vehicle Drive Shaft".

SUMMARY OF THE INVENTION

The present invention provides a uniquely configured spherical plain bearing which utilizes a dual spread lock sealing device for preventing contamination of the bearing surface and for maintaining lubrication thereover. The plain bearing itself includes an inner race member which defines an inner race bearing surface extending externally therearound. This inner race bearing surface is preferably of a generally spherically convex shape.

An outer race member is also included which includes an outer race body which defines a bearing cavity therein which is adapted to receive the inner race member positioned therein in such a manner as to be movable to form the rotational and spherical capability of movement of the relative bearing pieces. The outer race member further includes an outer race bearing surface defined within the bearing cavity. This outer race bearing surface is generally spherically concave and is positioned in abutment with and movable with respect to the inner race bearing surface of the inner race member whenever the inner race member itself is positioned within the bearing cavity of the outer race member. This outer race body will preferably define a seal mounting groove extending therearound at a position adjacent to the outer race bearing surface to facilitate sealing of the mated concentric spherical bearing surfaces.

In the preferred configuration the seal of the present invention is capable of being positioned within the seal mounting groove in such a manner as to retain lubrication between the inner race bearing surface of the inner race member and the outer race bearing surface of the outer race member. This seal will also have the effect of minimizing the flow of contaminants therebetween.

The particular construction of the seal includes a seal base member adapted to be positioned within the seal mounting groove defined in the outer race body for retaining therewithin. The seal may also preferably include an outer lip of flexibly resilient material which is attached to the seal base member and extends outwardly therefrom toward the inner race bearing surface. This outer lip member preferably is flexibly resiliently biased into abutment with this inner race bearing surface. The outer lip is also preferably oriented at an acute angle relative to the inner race bearing surface.

An inner lip is also included in the seal means formed of flexibly resilient material which is attached to the seal base member and extends outwardly therefrom toward the inner race bearing surface and resiliently biased into contact therewith. This inner lip will preferably be oriented at an acute angle relative to the inner race bearing surface.

In the preferred configuration of the present invention the seal base member, the outer lip and the inner lip will all be configured as a single integral member formed preferably of plastic and more particularly preferably formed of white nitrile.

Furthermore the inner lip of the present invention is preferably positioned extending inwardly toward the area of abutment between the inner race bearing surface and the outer race bearing surface. Also in the preferred configuration the outer lip of the seal is positioned extending outwardly away from the area of contact between the inner race bearing surface and the outer race bearing surface in order to maintain double lubrication sealing therebetween and to enhance positioning of the seal base member into the seal mounting groove by flexibly resilient force exerted thereon through the outer and inner lips.

In another preferred configuration the outer lip and the inner lip will be oriented at approximately sixty degrees with respect to one another, one oriented toward the mated bearing surfaces and one oriented away from the bearing surfaces. Also the outer lip means will be oriented at approximately sixty degrees relative to the inner race bearing surface in one direction and the outer lip means will be oriented at approximately sixty degrees relative to the inner race bearing surface in the other direction.

To achieve effective sealing it is preferred that the seal mounting groove be positioned extending along the outer periphery of the outer race bearing surface to facilitate retaining of lubrication between the bearing surfaces and to minimize contamination thereof. To further facilitate lubrication the inner lip means may defined one or more and preferably four individual lubrication holes extending therethrough to facilitate movement of lubrication over the inner race bearing surface between the outer lip and the inner lip.

It is preferable that the seal means be formed of a material sufficiently flexibly resilient in order to allow the outer lip and the inner lip to flex outwardly with respect to one another in order to temporarily increase the angular relationship therebetween whenever force is exerted on the seal base member directed downwardly approximately perpendicular to the inner race bearing surface. In this manner insertion of the seal into the groove by compression of the overall seal and movement toward the seal mounting groove is greatly facilitated.

It is preferable that the outer lip means and the inner lip means also act for the purpose of wiping the bearing surface over which they are caused to move during the normal range of movement of the inner race member relative to the outer race member. This wiping will maintain the lubrication within the inner and outer lips and across the bearing surfaces within the inner lip such that the outer lip will be formed to include an outer pointed end oppositely located from the seal base member thereon for facilitating sealed contact and wiping of the inner race bearing surface. Similarly it is preferable that the inner lip include an inner pointed end oppositely located from the seal base member to facilitate maintaining of sealed contact and wiping of the bearing surface.

The configuration of the seal mounting groove of the present invention can be symmetrical or asymmetrical and it has been found that the present invention is workable with both configurations as long as the properly mated configuration for the seal base member of the seal is chosen for use with that particular application. That is, the seal base member must define an external groove engaging surface which has a complementary shape mated to the mounting channel section defined in the seal mounting groove into which the seal base member is adapted to be positioned.

In the preferred configuration of the present invention the inner race member will be formed as an inner ring member and the outer race member will be formed as an outer ring member. With this configuration the inner race bearing surface and the outer race bearing surface will be formed as complementary concentric spherical surfaces.

With the outer race member formed ring shaped it will preferably define a first outer race opening and a second outer race opening on opposite sides of the outer race bearing surface. Each of these openings will preferably be in fluid flow communication with respect to the bearing cavity and, as such, require the positioning of a first sealing member around the first outer race opening and a second sealing member positioned about the second outer race opening for maintaining a lubrication between the first and second outer race openings.

The seal device as disclosed in the present invention can also be usable in sealing the inner race member with respect to a movable member which may be positioned protruding therethrough. Normally with such bearings as in the present invention a movable member will extend through a channel defined in the ring-shaped inner race member. As such, this channel means will include a first inner race opening and a second inner race opening. A first channel groove will be defined in the channel means adjacent the first inner race opening. Similarly a second channel groove will be positioned in the channel means adjacent the second inner race opening. This will necessitate the inclusion of a sealing device defined herein as the first supplemental sealing device to be mounted in the first channel groove for sealing between the movable member and the inner surface of the channel of the inner race member. Similarly a second supplemental sealing device will be mounted within the second channel groove for sealing of the channel therebetween responsive to this same movable member being positioned extending therethrough.

The configuration of the first supplemental sealing device will include a first supplemental seal base member adapted to be positioned in the first channel groove defined in the channel. A first supplemental outer lip of flexibly resilient material will preferably be integrally formed with the first supplementary seal base member and will extend outwardly therefrom away from the channel. This first supplementary outer lip means will preferably be oriented at an acute angle relative to the channel. The first supplementary outer lip means will be integrally formed with the first supplementary seal base member. Furthermore the first supplementary sealing device will include a first supplementary inner lip of flexibly resilient material attached to the first supplementary seal base member and extending outwardly therefrom away from the first supplementary outer lip. The first supplementary inner lip will be oriented at an acute angle relative to the channel. This first supplementary inner lip will be integrally formed preferably with respect to the first supplemental seal base member.

A second supplementary sealing device will be similarly constructed to the first supplementary sealing device and will include a second supplementary seal base member, a second supplementary outer lip and a second supplementary inner lip and will be positioned within the second channel groove means defined in the channel for sealing of the second inner race opening extending therethrough.

The present invention provides a spherical plain bearing with a spread lock dual sealing means which effectively prevents the movement of contaminants between the bearing surface.

The present invention provides a spherical plain bearing with a spread lock dual sealing means which effectively minimizes the loss of lubrication from the area of contact between the mated bearing surfaces.

The present invention provides a spherical plain bearing with a spread lock dual sealing means which can include a hole extending through the seal for lubricating of an area between the inner and outer lips of the dual sealing members.

The present invention provides a spherical plain bearing with a spread lock dual sealing means wherein an inner and outer lip are each included extending in opposite directions to facilitate flexible resilience of sealing and to enhance seal in the seal mounting groove.

The present invention provides a spherical plain bearing with a spread lock dual sealing means which is particularly usable for spherical plain bearings including two concentric spherical bearing surfaces.

The present invention provides a spherical plain bearing with a spread lock dual sealing means which maintains firm securement between the dual sealing lips and the bearing surfaces even after substantial wear has occurred from use.

The present invention provides a spherical plain bearing with a spread lock dual sealing means which includes flexibly resilient lip members engaging the bearing surface for wiping and sealing thereof made from plastic or white nitrile.

The present invention provides a spherical plain bearing with a spread lock dual sealing means which is usable with symmetrical or asymmetrical seal mounting grooves.

The present invention provides a spherical plain bearing with a spread lock dual sealing means which allows full flushing of lubrication.

The present invention provides a spherical plain bearing with a spread lock dual sealing means which is of minimal cost.

The present invention provides a spherical plain bearing with a spread lock dual sealing means which requires a minimum amount of maintenance.

The present invention provides a spherical plain bearing with a spread lock dual sealing means which can be easily installed by compressing and sliding into the seal mounting groove.

The present invention provides a spherical plain bearing with a spread lock dual sealing means which effectively seals in both directions to prevent the escape of lubrication and prevents the inflow of contaminants.

The present invention provides a spherical plain bearing with a spread lock dual sealing means which can use the identical sealing system for sealing between a movable member penetrating through the channel in the inner ring for lubrication between this movable member and the inner ring securement surface.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The present invention provides a spherical plain bearing with spread lock dual sealing capability. The configuration of the spherical plain bearing includes an inner race bearing member 10 preferably in the form of a ring which defined an inner race bearing surface 12 on the exterior surface thereof preferably of a spherically convex shape.

The bearing of the present invention also includes an outer race bearing member 14 preferably in the shape of a ring which includes an outer race body 16. Outer race body 16 defines a bearing cavity 18 therewithin. This bearing cavity 18 defines an outer race bearing surface 20 therein preferably of a spherically concave shape. When assembled the inner race member or ring 10 will be positioned within the bearing cavity 18 of the outer race member or ring 14 with the spherically concave outer race bearing surface 20 concentrically located around the spherically convex inner race bearing surface 12 to thereby form the spherical plain bearing configuration.

The present invention provides a unique seal mounting groove 22 extending around the edges of the mated bearing surfaces. A lubrication means 24 is adapted to extend across the inner race bearing surface 12 and the outer race bearing surface 20 for lubrication thereof to minimize wear and enhance rotational characteristics and decrease rotational friction of the overall bearing construction.

A seal 26 will be adapted to be placed within the seal mounting groove 22 to prevent the loss of lubrication from the area of contact between the inner race bearing surface 12 and the outer race bearing surface 20. This seal means 26 will preferably comprise a seal base member 28 itself of a mated configuration adapted to be placed within the seal mounting groove 22. Seal means 26 will preferably include an outer lip means 30 extending downwardly and outwardly from the seal base 28 away from the area of mating of the bearing surfaces 12 and 20. Preferably the outer lip means will extend through an acute angle 32 indicated as angle A relative to inner race bearing surface 12 and will extend to contact thereof for sealing thereagainst and wiping of that surface.

Figure 4:
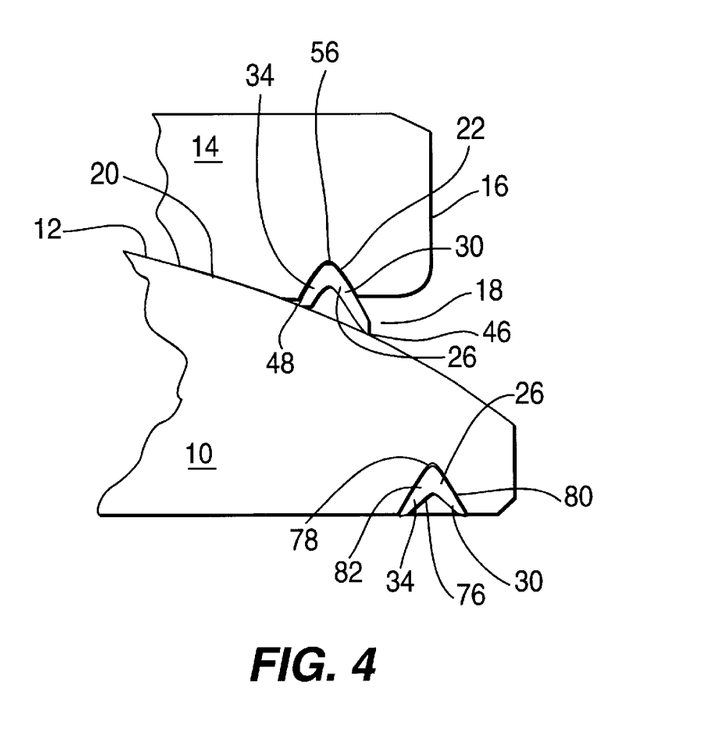
FIG. 4 is a close-up of the upper right hand corner of the embodiment shown in FIG. 1 showing the sealing means used simultaneously for sealing against the lubrication surfaces and for sealing between the inner member and the movable member.
Figure 5:
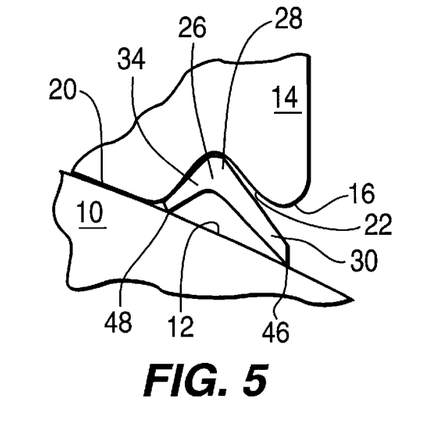
FIG. 5 shows an alternative embodiment of the seal means of the present invention shown positioned within an alternative embodiment of the configuration of the seal mounting groove.
Figure 6:
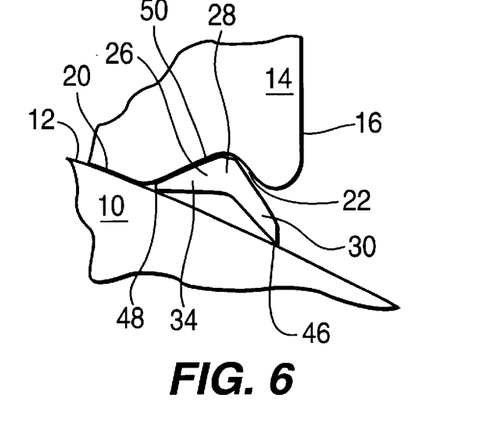
FIG. 6 is further embodiment of the seal means of the present invention shown positioned within a further embodiment of the configuration of the mounting groove.
Figure 7:
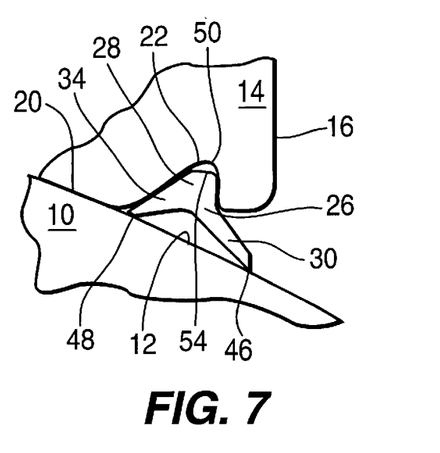
FIG. 7 is further embodiment of the seal means of the present invention shown positioned within a further embodiment of the configuration of the mounting groove.
Figure 8:
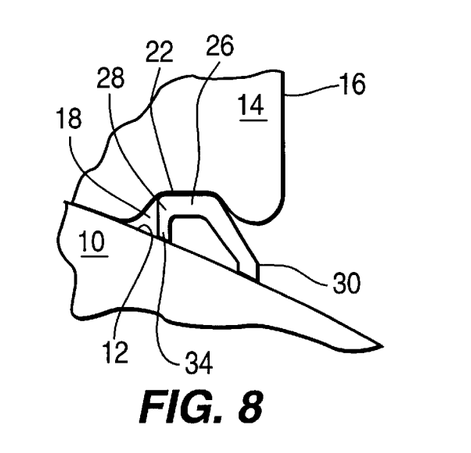
FIG. 8 is a further alternative configuration of the seal means and seal mounting groove of the present invention which shows a basic configuration with both lips extending in the same direction.
Figure 9:
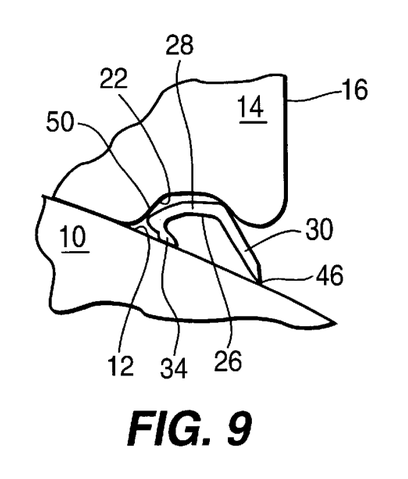
FIG. 9 is a further alternative configuration of the seal means and seal mounting groove of the present invention which shows an alternative configuration for both lips extending in the same direction.
Figure 10:
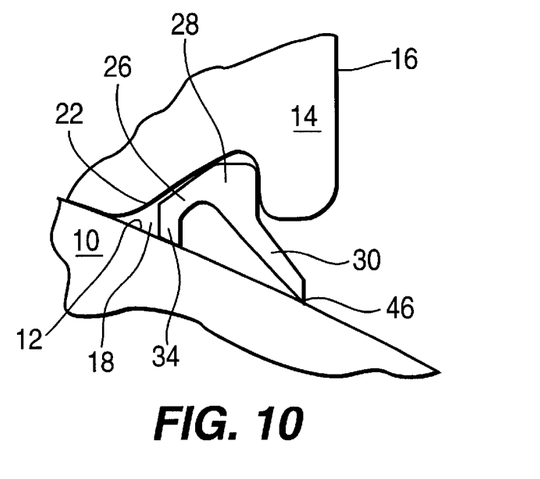
FIG. 10 is a further alternative configuration of the seal means and seal mounting groove of the present invention which shows a still further embodiment with both lips extending in the same direction with an asymmetrical seal cross section.

An inner lip means 34 will also preferably extend outwardly from the seal base member 28 and in the preferred configuration shown in FIGS. 1 through 7 will extend in a direction oppositely from the direction of extension of the outer lip 30. This inner lip 34 will be at an acute angle 36 indicated as angle B extending inwardly toward the area of engagement between the inner and outer race bearing surfaces 12 and 20. As such, in this particular configuration the outer lip member 30 and the inner lip member 34 will form a downwardly facing V-shape which engages the spherically convex inner race bearing surface 12 for sealing thereof against the movement of lubrication passed either of the lips 30 or 34 and also provides double protection against the flow of contaminants inwardly to the lubricating area. Preferably an acute angle 38 indicated as angle C will be positioned between numbers 30 and 34. In the most particular configuration shown in FIG. 3 angles 32, 36 and 38 shown as angles A, B and C will all be approximately sixty degrees. However, these values can vary as shown in the other drawings for the purposes of providing asymmetrical configurations for the individual seals 26 most particularly as shown in FIGS. 5, 6 and 7 as well as FIG. 2.

To further enhance lubrication a lubrication hole 40 may be defined extending through the inner lip 34. This lubrication hole 40 can be located at multiple locations about the generally round seal 26. This hole allows lubrication to flow from the area of engagement between the inner race bearing surface 12 and the outer race bearing surface 20 to the portion of the outer race bearing surface 20 located between the inner lip means 34 and the outer lip means 30 to facilitate lubrication thereof. This hole also allows for overflow lubrication during normal maintenance re-lubrication of the bearing.

Figure 1:
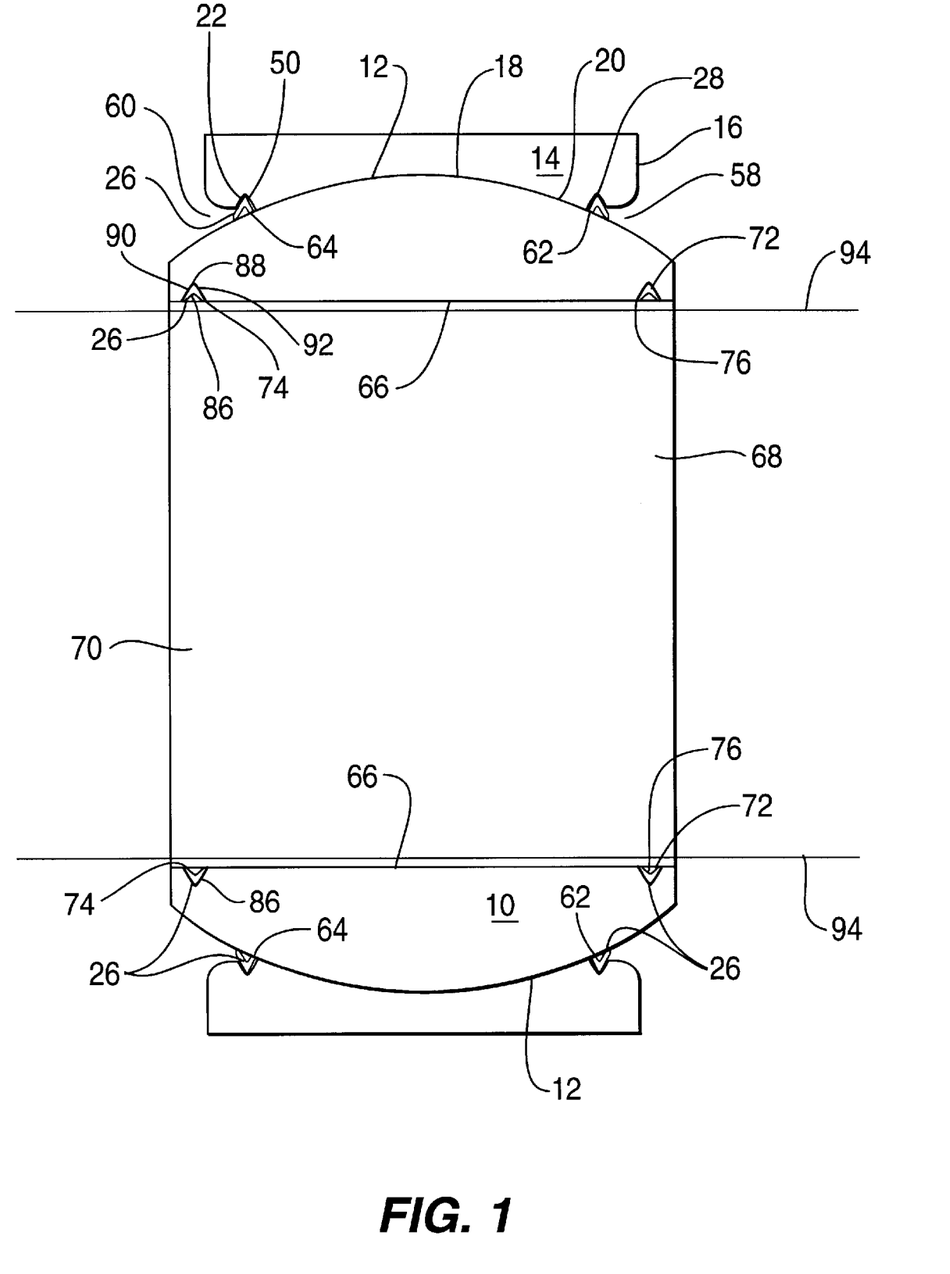
FIG. 1 is a cross-sectional view of an embodiment of the spherical plain bearing with spread lock dual sealing means.
Figure 2:
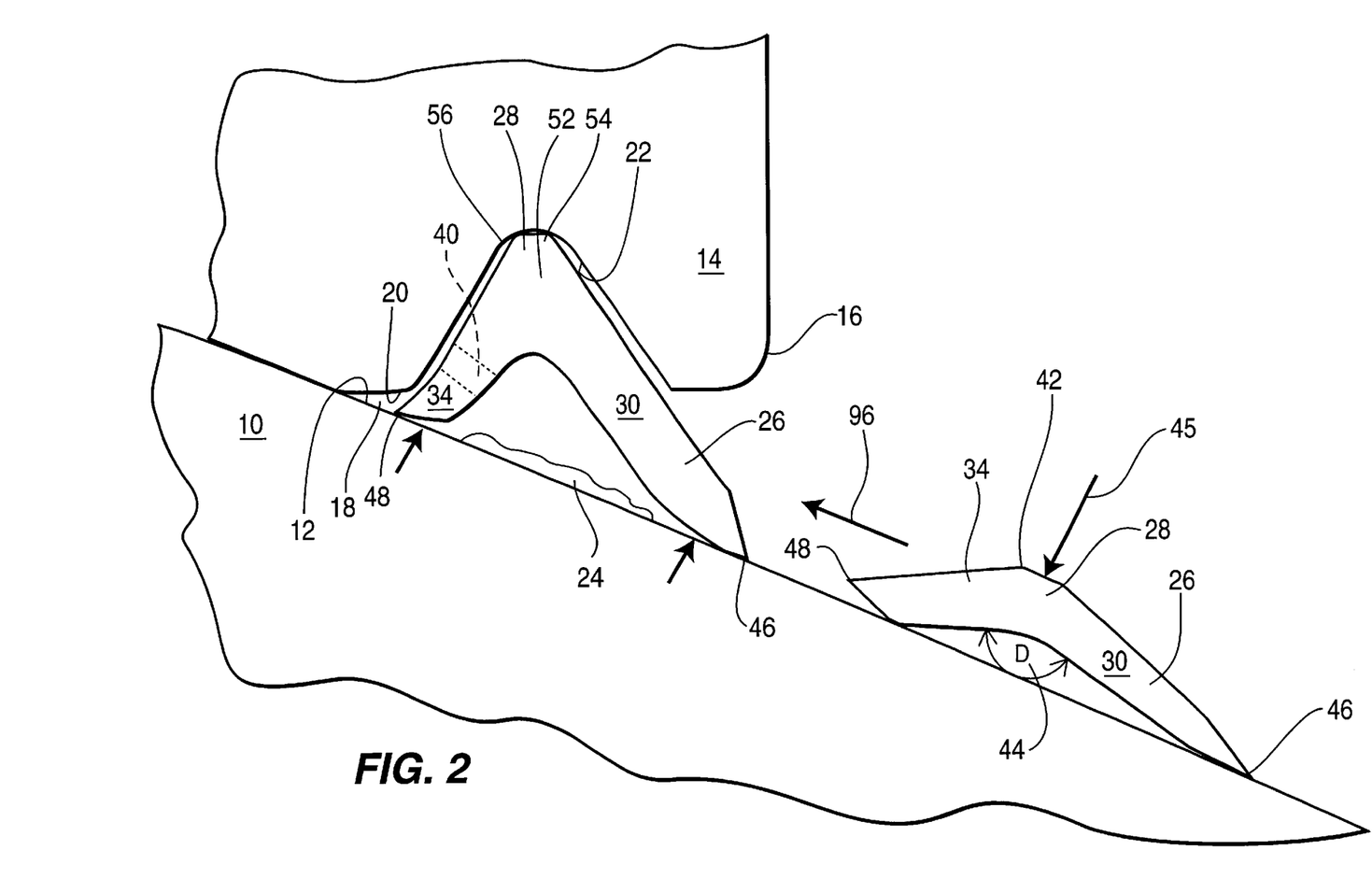
FIG. 2 is close-up of the embodiment of the seal mounting groove and seal means located therein and being compressed for placement therein.
Figure 3:
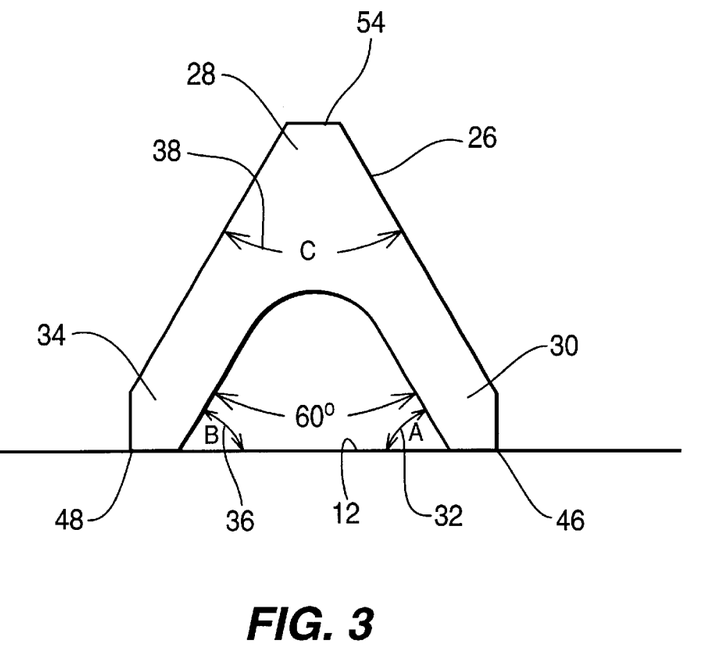
FIG. 3 side cross-sectional view of an alternative embodiment of a seal means of the present invention symmetrically configured.

Placement of the seal 26 into the seal mounting groove 22 is greatly enhanced by the flexible resilience thereof. The position of insertion and the position after insertion is shown best in FIG. 2. FIG. 2 shows the compressed position 42 of the seal means 26. In this compressed position shown in the right of FIG. 2 the angle 44 referred to as angle D between the inner and outer lips 34 and 30 will be significantly increased when compressed downwardly by the exertion of force as indicated by the arrow of reference number 48. The exertion of a downwardly directed fore such as by automated installation means for merely a user's hand or finger will compress the seal means 26 to the position shown on the right, namely compressed position 42. In this position the outer lip means 30 and the inner lip means 35 will be compressed to a position almost parallel to the inner race bearing surface. This will allow the insertion personnel to slide the seal 26 upwardly till it is in position immediately beneath the seal mounting groove 22 whereafter the user can release the force exerted along arrow 45 to allow the seal 26 to snap into place as shown in the left portion of FIG. 2. Insertion of seal 26 occurs along the insertion direction arrow 96.

Engagement between the outer lip means 30 and the inner lip means 34 relative to the generally spherically convex inner race bearing surface 12 is greatly enhanced by use of pointed ends thereon. In particular the outer lip 30 will preferably define an outer pointed end 46 at the extreme outwardly most portion thereof which greatly facilitates flexible resilience of the lip and wiping of the inner race bearing surface 12 as desired. In a similar manner the inner lip 34 will preferably include an inner pointed end means 48 thereon which facilitates flexible resilience and slight bending or flexing of the inner lip 34 during insertion and after insertion to maintain contact with the bearing surface even after significant wear occurs.

The present invention is usable with symmetrical sealing mounting groove means 52 such as shown best in FIGS. 2 and 4. However, the seal 26 of the present invention is also usable with respect to asymmetrical seal mounting groove means 50 as shown in FIGS. 6, 7, 8, 9, and 10.

The seal mounting groove 22 will define a mounting channel section 56 which is adapted to directly engage the seal 26. The seal 26 will define an external groove engaging surface 54 which is adapted to directly engage the mounting channel section 56. It is preferable that the groove engaging surface 54 and the mounting channel section 56 be of a complementary mated configuration to maintain full contact for holding of the seal base member 28 firmly within the seal mounting groove 22 under all operating conditions.

In a preferred configuration of the present invention the inner race member 10 will be generally ring-shaped and the outer race member 14 will be generally ring-shaped. As such, the bearing cavity 18 will define a first outer race opening 58 and a second outer race opening 60. Each of these openings will require the placement of a sealing configuration therearound. As such, a first sealing member 62 will be positioned extending around the first outer race opening 58. This first sealing member will be chosen of a configuration as shown in the present invention for the seal 26. Similarly the second sealing member 64 will be positioned about the second outer race opening 60 for sealing thereof and will be chosen from any configuration disclosed in the present invention for the seal means 26.

It is also possible that a sealing configuration similar to the above-described sealing means could be used to seal between the inner race member 10 and a movable member 94 which may extend therethrough. In the preferred configuration for a spherical bearing the inner race member 10 which is ring-shaped will define a channel means 66 extending therethrough. This channel means will define a first inner race opening means 68 at one end thereof and a second inner race opening means 70 at the opposite end thereof. Adjacent the first inner race opening means 68 a first channel groove 72 will be defined for receiving of a sealing means. Similarly a second channel groove means 74 will be defined adjacent the second inner race opening 70 for facilitating sealing thereof.

A first supplementary sealing device 76 will preferably be positionable in the first channel groove 72 for sealing of the first inner race opening 68. This first supplementary sealing device 76 will include a first supplementary seal base member 78 to be directly placed within the first channel groove 72. A first supplementary outer lip 80 will be integral with an extend outwardly from the first supplementary seal base member 78. Also a first supplementary inner lip 82 will be integral with and extend outwardly from the first supplementary seal base member 78. As so constructed this first supplementary sealing device 76 will effectively seal between the movable member 94 and the first inner race opening 68.

Similarly a second supplementary sealing device 86 will be included comprising a second supplementary seal base member 88 with a second supplementary outer lip 90 integral therewith and extending outwardly therefrom. Also a second supplementary inner lip means 92 will be integral with and extend outwardly from the second supplementary seal base member 88. As such, this configuration of the second supplementary sealing device 86 will be placed within the second channel groove 74 to seal the second inner race opening 70 between the inner race member 10 and the movable member 94.

One of the primary inventive characteristics of the present invention is the ability to have effective full sealing and wiping of a bearing surface even after an extensive time period of use. This is achievable due to the enhanced wear characteristics of this design. This configuration allows a significant amount of wear to occur on the outer lip 30 and inner lip 34 of the seal 26 of the present invention without seriously effecting sealing and wiping. This is achieved due to the flexible resilience of the material from which the seal member 26 is formed. As shown in FIG. 2 after insertion is made along arrow 96 the inner and outer lips 30 and 34 will still be flexibly compressed to a slight extent. This slight compression will enhance sealing with the bearing surface while at the same time will allow wear to occur while still maintaining this seal. Thus the construction of the inverted V-shaped downwardly facing seal provides a self-adjusting characteristic not present in constructions heretofore.

It also should be appreciated that the apparatus of the present invention will work well without a downwardly facing V-shape along as there is still two lips extending outwardly from the seal base member 28 of the individual seal means 26. These configurations are shown best in FIGS. 8, 9 and 10 where there are downwardly directed two sealing lips however the lips are not in the form of a V-shape since they both extend in the same direction, namely, both lips extend outwardly away from the engaging area of the bearing surfaces 12 and 20.

Most prior art designs include asymmetrical configurations with only a single sealing lip. These configurations have a natural tendency to be easily removed after wear has occurred or to be difficult to position in place initially. The present invention overcomes these difficulties by providing an inner lip means 34 as well as an outer lip means 30. This dual sealing means enhanced lubrication, further minimizes contamination of the bearing and at the same time provides a self-adjusting characteristic not present in designs at this time.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A spherical plain bearing with an enhanced spread lock dual sealing means comprising:

A. an inner race member defining an inner race bearing surface extending externally therearound, said inner race bearing surface being generally spherically convex;

B. an outer race member comprising:
  (1) an outer race body defining a bearing cavity means therein adapted to receive said inner race member movably positioned therewithin;
  (2) an outer race bearing surface defined within said bearing cavity means, said outer race bearing surface being generally spherically concave and positioned in abutment with and movable with respect to said inner race bearing surface of said inner race member responsive to positioning of said inner race member within said bearing cavity means of said outer race member, said outer race body defining a seal mounting groove means positioned adjacent said outer race bearing surface therebetween;

C. a seal means positionable within said seal mounting groove means to retain lubrication between said inner race bearing surface of said inner race member and said outer race bearing surface of said outer race member and to minimize movement of contaminants therebetween, said seal means comprising:
  (1) a seal base member adapted to be positioned within said seal mounting groove means defined in said outer race body;
  (2) an outer lip means of flexibly resilient material attached to said seal base member and extending outwardly therefrom toward said inner race bearing surface and flexibly resiliently biased into abutment therewith, said outer lip means being oriented at an acute angle relative to said inner race bearing surface; and (3) an inner lip means of flexibly resilient material attached to said seal base member and extending outwardly therefrom toward said inner race bearing surface and resiliently biased into abutment therewith, said inner lip means being oriented at an acute angle relative to said inner race bearing surface, said inner lip means being oriented at an acute angle with respect to said outer lip means to maintain dual sealing against said inner race bearing surface to maintain lubrication therebetween and to facilitate seating of said seal base member within said seal mounting groove.

2. A spherical plain bearing with an enhanced spread lock dual sealing means as defined in claim 1 wherein said inner lip means of said seal means is positioned extending inwardly toward the area of abutment between said inner race bearing surface and said outer race bearing surface and wherein said outer lip means of said seal means is positioned extending outwardly away from the area of contact between said inner race bearing surface and said outer race bearing surface to maintain dual lubrication sealing therebetween and to facilitate retaining of said seal means within said seal mounting groove means.

3. A spherical plain bearing with an enhanced spread lock dual sealing means as defined in claim 1 wherein said inner race member is ring-shaped and defines a channel means extending therethrough and further defines a first inner race opening means and a second inner race opening means therein spatially disposed from one another and in fluid flow communication with said channel means, said inner race member defining a first channel groove means in said channel means adjacent said first inner race opening means and defining a second channel groove means in said channel means adjacent said second inner race opening means, and further including a first supplementary sealing device mounted within said first channel groove means and a second supplementary sealing device mounted within said second channel groove means for sealing of said channel means therebetween responsive to a member being positioned extending therethrough.

4. A spherical plain bearing with an enhanced spread lock dual sealing means as defined in claim 3 wherein said first supplementary sealing device comprises:

A. a first supplementary seal base member adapted to be positioned within said first channel groove means defined in said channel means;

B. a first supplementary outer lip means of flexibly resilient material attached to said first supplementary seal base member and extending outwardly therefrom away from said channel means, said first supplementary outer lip means being oriented at an acute angle relative to said channel means, said first supplementary outer lip means being integrally formed with said first supplementary seal base member; and C. an first supplementary inner lip means of flexibly resilient material attached to said first supplementary seal base member and extending outwardly therefrom away from said first supplementary outer lip means, said first supplementary inner lip means being oriented at an acute angle relative to said channel means, said first supplementary inner lip means being integrally formed with said first supplementary seal base member.

5. A spherical plain bearing with an enhanced spread lock dual sealing means as defined in claim 3 wherein said second supplementary sealing device comprises:

A. a second supplementary seal base member adapted to be positioned within said second channel groove means defined in said channel means;

B. a second supplementary outer lip means of flexibly resilient material attached to said second supplementary seal base member and extending outwardly therefrom away from said channel means, said second supplementary outer lip means being oriented at an acute angle relative to said channel means, said second supplementary outer lip means being integrally formed with said second supplementary seal base member; and C. an second supplementary inner lip means of flexibly resilient material attached to said second supplementary seal base member and extending outwardly therefrom away from said second supplementary outer lip means, said second supplementary inner lip means being oriented at an acute angle relative to said channel means, said second supplementary inner lip means being integrally formed with said second supplementary seal base member.

6. A spherical plain bearing with an enhanced spread lock dual sealing means as defined in claim 1 wherein said inner lip means defines a lubrication hole means extending therethrough to facilitate movement of lubrication over said inner race bearing surface between said outer lip means and said inner lip means.

7. A spherical plain bearing with an enhanced spread lock dual sealing means as defined in claim 6 wherein each seal means includes four individual lubrication hole means to facilitate flow of lubrication therearound.

8. A spherical plain bearing with an enhanced spread lock dual sealing means as defined in claim 1 wherein said outer lip means and said inner lip means are integrally formed with said seal base member to form said seal means as a single flexibly resilient means for retaining lubrication.

9. A spherical plain bearing with an enhanced spread lock dual sealing means as defined in claim 1 wherein said seal means is sufficiently flexibly resilient to allow said outer lip means and said inner lip means to flex outwardly with respect to one another to temporarily increase the angular relationship therebetween responsive to force being exerted on said seal base member downwardly thereon approximately normal to said inner race bearing surface to facilitate insertion thereof into said seal mounting groove means for retaining therein with said inner race member already positioned within said bearing cavity means of said outer race member.

10. A spherical plain bearing with an enhanced spread lock dual sealing means as defined in claim 1 wherein said inner lip means of said seal means is oriented at approximately sixty degrees relative to said inner race bearing surface and is positioned extending inwardly toward the area of contact between said inner race bearing surface and said outer race bearing surface and wherein said outer lip means of said seal means is oriented at an angle of less than sixty degrees relative to said inner race bearing surface and is positioned extending outwardly away from the area of contact between said inner race bearing surface and said outer race bearing surface to maintain dual lubrication sealing therebetween.

11. A spherical plain bearing with an enhanced spread lock dual sealing means as defined in claim 1 wherein said outer lip means includes an outer pointed end means oppositely located from said seal base member to facilitate maintaining of sealed contact thereof with respect to said inner race bearing surface and wherein said inner lip means includes an inner pointed end means oppositely located from said seal base member to facilitate maintaining of sealed contact thereof with respect to said inner race bearing surface.

12. A spherical plain bearing with an enhanced spread lock dual sealing means as defined in claim 1 wherein said seal mounting groove means is positioned extending along the outer periphery of said outer race bearing surface to facilitate maintaining of lubrication on said inner race bearing surface and said outer race bearing surface and to minimize movement of contaminants thereon.

13. A spherical plain bearing with an enhanced spread lock dual sealing means as defined in claim 1 wherein said inner lip member and said outer lip member of said seal means are asymmetrical relative to one another in order to facilitate prevention of movement of lubrication therepast.

14. A spherical plain bearing with an enhanced spread lock dual sealing means as defined in claim 1 wherein said seal base member defines an external groove engaging surface having a complementary shape mated to said seal mounting groove means to facilitate retaining of said seal base member within said seal mounting groove means.

15. A spherical plain bearing with an enhanced spread lock dual sealing means as defined in claim 14 wherein said sealing mounting groove means includes a mounting channel section having a concave profile of approximately sixty degrees and wherein said external groove engaging surface of said seal base member has a convex profile of approximately sixty degrees to mate with and fittingly engage with said mounting channel means.

16. A spherical plain bearing with an enhanced spread lock dual sealing means as defined in claim 1 wherein said seal means is made of plastic.

17. A spherical plain bearing with an enhanced spread lock dual sealing means as defined in claim 16 wherein said seal means is made of white nitrile material.

18. A spherical plain bearing with an enhanced spread lock dual sealing means as defined in claim 1 wherein said inner race member comprises an inner ring member and wherein said outer race member comprises an outer ring member and wherein said inner race bearing surface and said outer race bearing surface are formed as complementary concentric spherical surfaces.

19. A spherical plain bearing with an enhanced spread lock dual sealing means as defined in claim 1 further comprising lubrication means located extending over said inner race bearing surface and over said outer race bearing surface to facilitate lubrication thereover and minimize wear thereof.

20. A spherical plain bearing with an enhanced spread lock dual sealing means as defined in claim 1 wherein said outer race member is ring-shaped and defines a first outer race opening means and a second outer race opening means on opposite sides of said outer race bearing surface and each being in fluid flow communication with respect to said bearing cavity means defined therein and wherein said seal means further includes a first sealing member extending around said first outer race opening means and a second sealing member extending around said second outer race opening means for sealing of said outer race bearing surface located therebetween.

21. A spherical plain bearing with an enhanced spread lock dual sealing means comprising:

A. an inner race member defining an inner race bearing surface extending externally therearound, said inner race bearing surface being generally spherically convex, said inner race member comprising an inner ring member;

B. an outer race member comprising:
  (1) an outer race body defining a bearing cavity means therein adapted to receive said inner race member movably positioned therewithin, said outer race body comprising an outer ring member;
  (2) an outer race bearing surface defined within said bearing cavity means, said outer race bearing surface being generally spherically concave and positioned in abutment with and movable with respect to said inner race bearing surface of said inner race member responsive to positioning of said inner race member within said bearing cavity means of said outer race member, said outer race body defining a seal mounting groove means positioned adjacent said outer race bearing surface therebetween, said seal mounting groove means being positioned extending along the outer periphery of said outer race bearing surface to facilitate maintaining of lubrication on said inner race bearing surface and said outer race bearing surface and to minimize movement of contaminants therebetween, said sealing mounting groove means including a mounting channel section having a concave profile of approximately sixty degrees, said inner race bearing surface and said outer race bearing surface being formed as complementary concentric spherical surfaces;

C. a seal means of plastic flexibly resilient material positionable within said seal mounting groove means to retain lubrication between said inner race bearing surface of said inner race member and said outer race bearing surface of said outer race member and to minimize movement of contaminants therebetween, said seal means comprising:
  (1) a seal base member of plastic flexibly resilient material adapted to be positioned within said seal mounting groove means defined in said outer race body, said seal base member defining an external groove engaging surface having a complementary shape mated to said seal mounting groove means to facilitate retaining of said seal base member within said seal mounting groove means, said external groove engaging surface of said seal base member having a convex profile of approximately sixty degrees to mate with and fittingly engage with said mounting channel section of said mounting channel means;
  (2) an outer lip means of plastic flexibly resilient material attached to said seal base member and extending outwardly therefrom toward said inner race bearing surface and flexibly resiliently biased into abutment therewith, said outer lip means being oriented at an acute angle relative to said inner race bearing surface, said outer lip means of said seal means being positioned extending outwardly away from the area of contact between said inner race bearing surface and said outer race bearing surface to maintain dual lubrication sealing therebetween and to facilitate retaining of said seal means within said seal mounting groove means, said outer lip means being integrally formed with respect to said seal base member; and
  (3) an inner lip means of plastic flexibly resilient material attached to said seal base member and extending outwardly therefrom toward said inner race bearing surface and resiliently biased into abutment therewith, said inner lip means being oriented at an acute angle relative to said inner race bearing surface, said inner lip means of said seal means being positioned extending inwardly toward the area of abutment between said inner race bearing surface and said outer race bearing surface, said inner lip means being oriented at an acute angle with respect to said outer lip means to maintain dual sealing against said inner race bearing surface to maintain lubrication therebetween and to facilitate seating of said seal base member within said seal mounting groove, said inner lip means being integrally formed with respect to said seal base member and said outer lip means to form a single integral flexibly resilient seal means, said seal means being sufficiently flexibly resilient to allow said outer lip means and said inner lip means to flex outwardly with respect to one another to temporarily increase the angular relationship therebetween responsive to force being exerted onto said seal base member downwardly thereon approximately normal to said inner race bearing surface to facilitate insertion thereof into said seal mounting groove means for retaining therein with said inner race member already positioned within said bearing cavity means of said outer race member.

\* \* \* \* \*